United States Patent Office 3,488,800
Patented Jan. 13, 1970

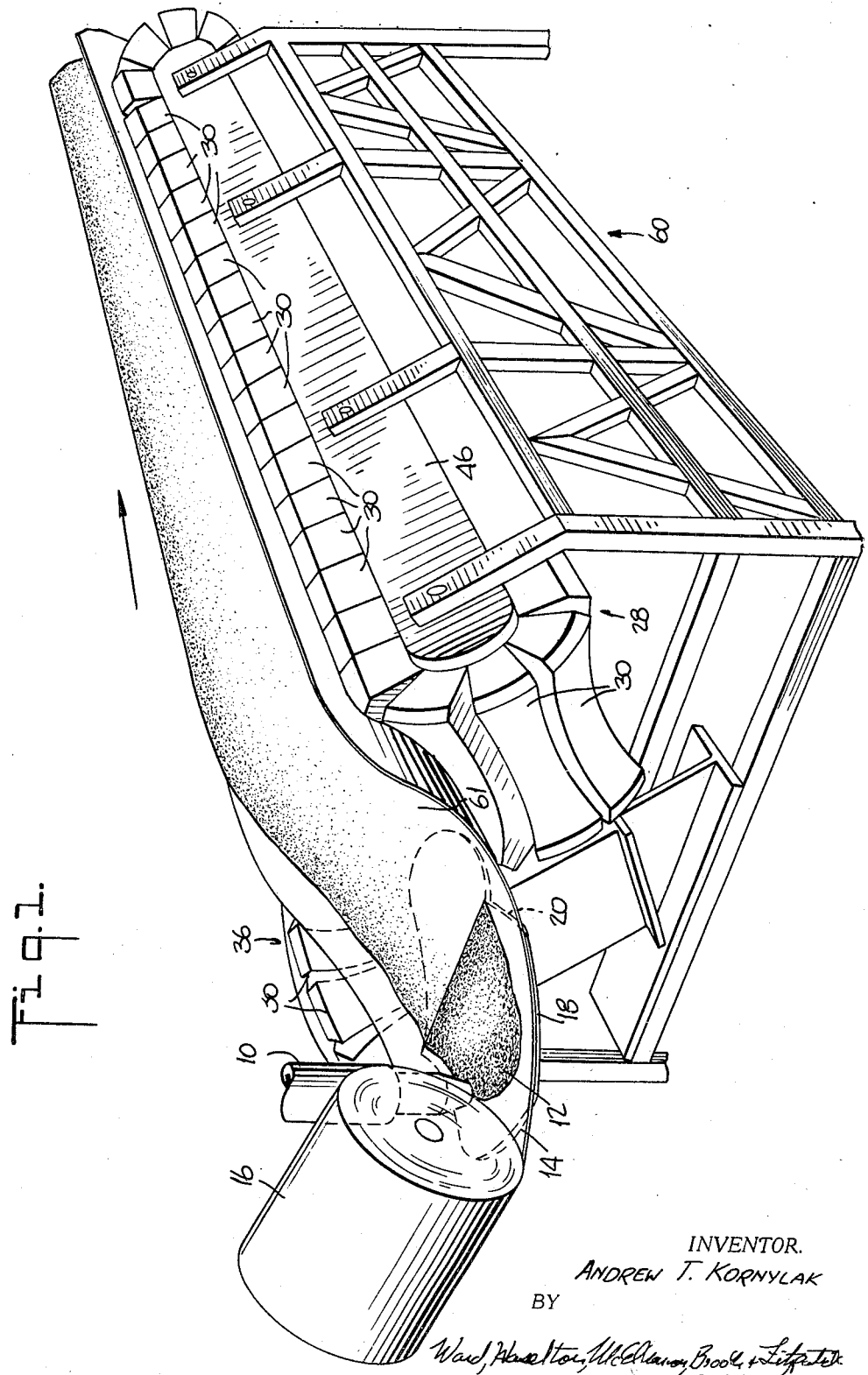

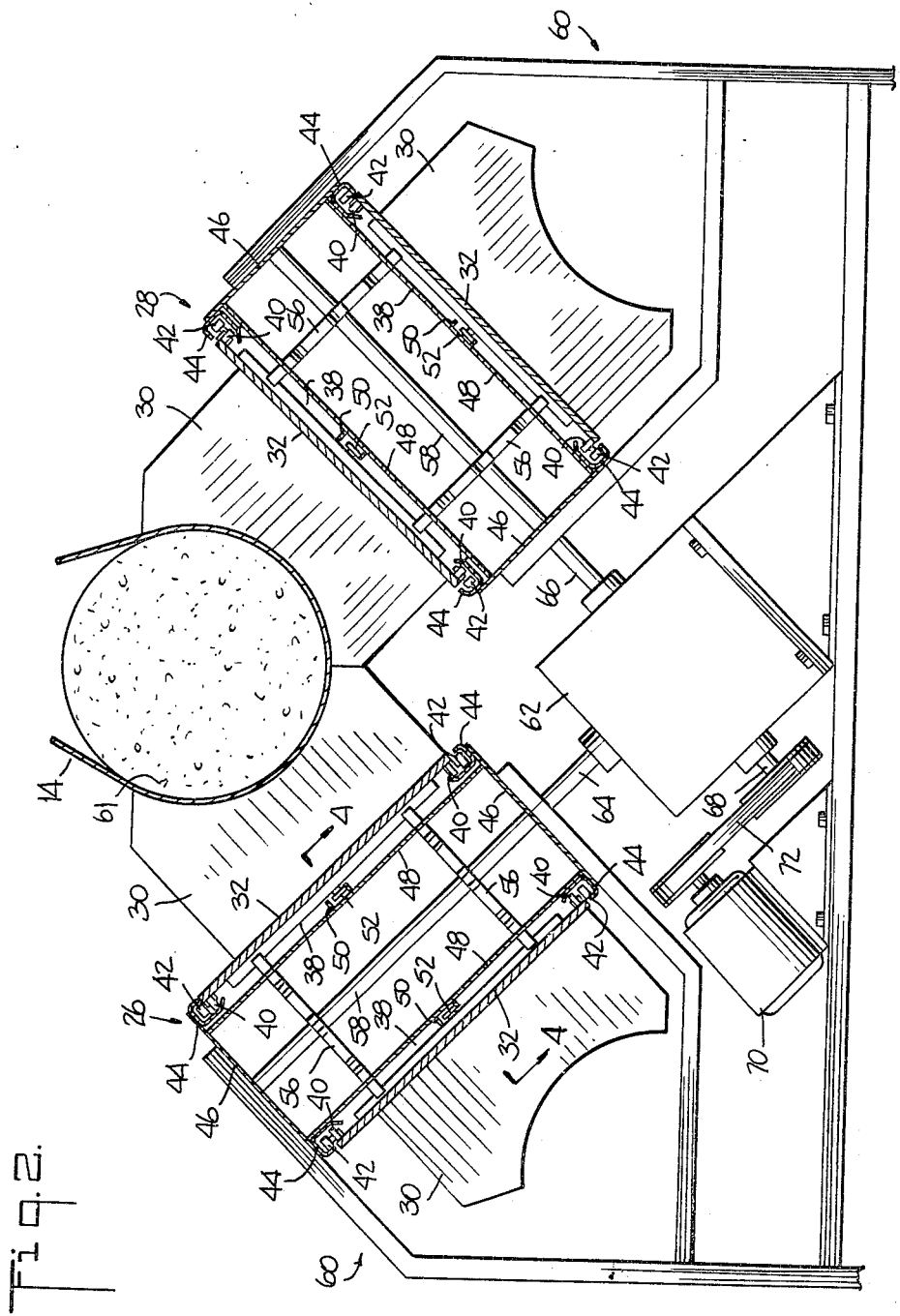

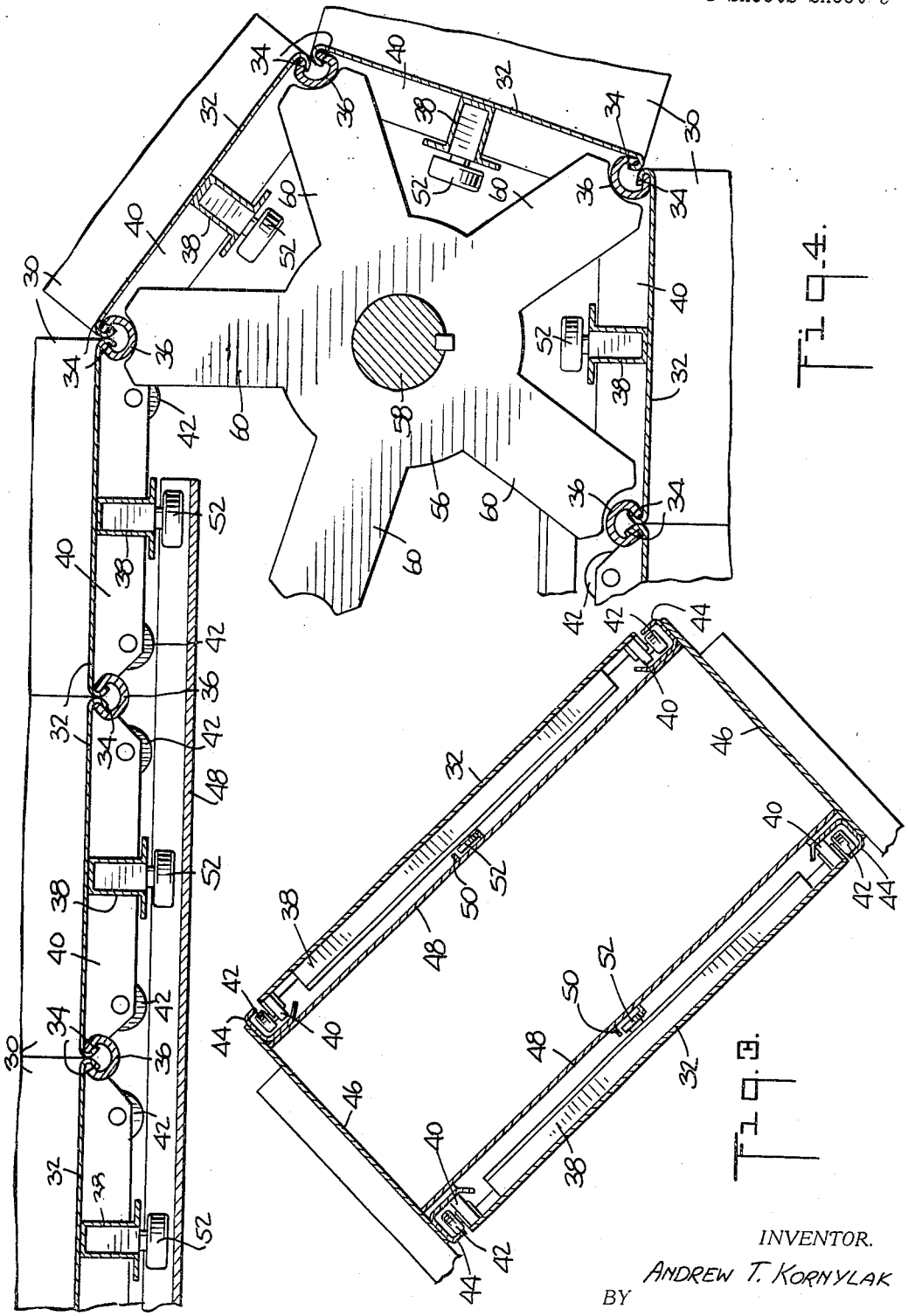

3,488,800
CONTINUOUS MOLDER
Andrew T. Kornylak, Hamilton, Ohio, assignor to Tenneco Chemicals, Inc., New York, N.Y., a corporation of Delaware
Filed Feb. 19, 1968, Ser. No. 706,303
Int. Cl. B29c 5/00
U.S. Cl. 18—4          10 Claims

ABSTRACT OF THE DISCLOSURE

Molding device comprising a pair of elongated loop conveyors arranged side by side and tilted to form a trough between them, the conveyors having a plurality of adjacent mold segments which cooperate to define a continuous elongated moving channel of desired cross-section.

---

This invention relates to molding devices and more particularly it concerns conveyor type continuous molders for forming elongated products of substantially uniform cross-section.

The present invention is particularly useful in connection with the continuous molding of large diameter cylindrical buns of foamed polyurethane. These buns are cut into lengths of about three to fifteen feet and beyond; and they are thereafter rotated against a knife blade which peels from them a thin continuous sheet of foamed polyurethane. These sheets have many uses, particularly in the textile industry where they are used as a backing or insulating laminate for fabrics. They are also used as an adhesive or bonding layer between two adjacent layers of fabric or similar material.

The economy of the peeled cylindrical method of sheet foam production is highly dependent upon the diameter of the cylindrical buns that are produced. Accordingly, means have been sought to produce cylinders with diameters ranging from thirty to forty-five inches, and even higher.

The production of large diameter foam cylinders poses certain problems. If the production process is to be efficient, it must be continuous. U.S. Patent 3,281,894 shows a continuous cylindrical bun molding apparatus which has operated quite successfully. The apparatus comprises a pair of continuous loop type side conveyors and a bottom conveyor. The side conveyors are provided with mold segments which cooperate, as the conveyors operate, to define a continuous round channel within which the polyurethane material is carried as it foams into cylindrical shape. The bottom conveyor provides no shaping function as such; but it does provide bottom support to ease the strain imposed upon the side conveyors by the weight of the polyurethane material.

The present invention represents a modification of the apparatus shown in U.S. Patent 3,281,894, and it possesses certain additional features and advantages which are not present in that apparatus. According to the present invention there are provided not three, but two, endless loop type downwardly slanted conveyors. These conveyors are arranged in side-by-side relationship; however they are tilted in toward each other so as to form a moving trough. Mold segments are secured to each conveyor and are configured to form a circular or other desired cross-sectional configuration inside the trough.

With this arrangement no separate bottom supporting conveyor is needed. This is because the two tilted conveyors are oriented such that they can withstand the weight of the polyurethane material without undue strain. In addition, by orienting the conveyor drive axles along intersecting lines, it is possible to drive them in synchronism from a single motor operating through a simple and commercially available drive system. Such drive system for example may be a gearbox having a right angled drive with a single input shaft and two output shafts oriented at right angles to each other. The gearbox may be positioned with the intersection of its output shaft lines located at the intersection of the drive axle lines of the two conveyors. The gearbox output shafts then may be coupled directly to the conveyor drive axles.

The present invention additionally provides an improved transition at each end of the molding channel formed between the two conveyors. This is because the individual segments which come together to form the moving mold channel at the input end and which depart from each other to strip away the channel at the output end, approach and depart from the channel region at relatively shallow angles so that the transition is a gradual one, providing a maximum of support and a minimum of disruption to either the reacting ingredients or to the finished product.

Various further and more specific objects, features and advantages of the invention will appear from the description given below, taken in connection with the accompanying drawings, illustrating by way of example a preferred form of the invention.

In the drawings:

FIG. 1 is a perspective view of a continuous molding apparatus forming a preferred embodiment of the present invention;

FIG. 2 is an enlarged section view taken along line 2—2 of FIG. 1;

FIG. 3 is a further section view taken along line 3—3 of FIG. 2; and

FIG. 4 is a still further section view taken along line 4—4 of FIG. 3.

The molding apparatus shown in FIGS. 1–4 is designed to produce large diameter cylindrically shaped elements of foamed polyurethane from a liquid reaction mixture. These elements, which may attain a diameter of 30 to 45 inches or more, are thereafter rotated against a knife blade and are thus peeled to form large elongated continuous sheets.

As shown in FIG. 1, there is provided a deposit nozzle 10 through which liquid reactants 12 are supplied from a source (not shown). These liquid reactants may, for example, include polymeric polyesters or polyesters having a plurality of hydroxyl groups in the molecule, organic isocyanates such as tolylene diisocyanate (TDI), and various amines as catalysts. When such reactants are brought together under atmospheric conditions, both foaming and curing reactions take place simultaneously so that there is produced an expanded formed solid product which, depending upon the particular ingredients utilized, may be either rigid or resilient.

As shown in FIG. 1, the liquid reactants 12, as above described, are deposited from the deposit nozzle 10 downwardly upon a moving web of release material 14. This release material is specially coated or otherwise treated to prevent the reactants or the products formed thereby from sticking to it upon completion of the reaction. The web 14 is withdrawn from a supply roll 16 and is caused to move along longitudinally under the deposit nozzle 10 in flattened configuration. The web 14 may be supported beneath the deposit nozzle 10 by means of a pour plate 18. The pour plate 18 is formed downstream of the nozzle 10 with an upwardly protruding weir formation 20. As the web 14 passes over the pour plate 18 it follows the contour of the weir formation 20. This serves to control the downstream flow of the liquid reactants 12 in this region so as to optimize the conditions under which they react.

Immediately beyond the pour plate 18 there are provided a pair of downwardly inclined elongated cooperating mold conveyors shown generally at 26 and 28. The conveyors 26 and 28, as shown in FIGS. 1 and 2, comprise a plurality of shaped mold segments 30 mounted adjacent to one another on various interconnected links 32 forming continuous belt loops.

The individual links 32 making up the belt loops are elongated sheet metal members which are bent back at an acute angle along their longitudinal edges to form connecting flanges 34. The connecting flanges of adjacent belt links are held together loosely, though securely, by rigid link connectors 36 of generally C-shaped cross-section.

The individual links 32 are strengthened by means of stiffener ribs 38 of channel-shaped cross-section and extending longitudinally up the center of each rib.

There are additionally provided upper and lower flanges 40 at the ends of each link 32; and these flanges carry circumferential rollers 42. As shown in FIGS. 2 and 4, the circumferential rollers 42 ride in circumferential tracks 44 which extend around in an elongated loop and thereby define the overall path of conveyor movement. The tracks 44 are also generally of C-shaped cross-section and serve to provide conveyor support in a direction perpendicular to the plane of the links 32. The circumferential tracks 44 are supported on side plates 46 which extend longitudinally on each side of the two conveyors 26 and 28.

The side plates 46 additionally support spacer members 48 on which are mounted channel-shaped lateral roller tracks 50. Lateral rollers 52 are mounted approximately midway along the lines of the various stiffener ribs 38. These lateral rollers engage and roll along in the channel-shaped lateral track 50 and thereby provide conveyor support in a direction parallel to the plane of the links 32.

The belt loops are driven by means of sprocket wheels 56 mounted on drive axles 58 at one end of each conveyor. The axles 58, it will be noted, extend along lines parallel to the plane of the links 32. The sprocket wheels 56 are formed with elongated sprocket arms 60, the tips of which are shaped to engage the various link connectors 36 so as to move the connectors and associated links 32 along with rotation of the sprocket wheel 56.

As shown in FIGS. 1 and 2 the conveyors 26 and 28 are inclined longitudinally in the downstream direction. Also as shown, they are mounted such that their respective drive axles 58 are oriented at right angles to each other. Thus, the lateral planes of the belt loops are also at right angles to each other and define a V-shaped trough between them. As shown in FIG. 2, the various mold segments 30 which are mounted on the links 32 of the two conveyors 26 and 28, are configured such that each defines an adjacent sector of an elongated semi-cylindrical channel 61 extending lengthwise of and between the two conveyors 26 and 28. Each mold segment 30 may extend over approximately 110° of arc so that the channel 61 is partially closed, though in this preferred embodiment, not completely closed.

The conveyors 26 and 28 are maintained in their above-described positions by means of a support frame 60 which is built up of a plurality of structural members welded or otherwise secured together in truss-like configuration.

The two drive axles 58 from the conveyors 26 and 28 extend down into and interconnect with output shafts from a right angle drive mechanism 62. This right angle drive mechanism, which is commercially available from several sources, includes a pair of output shafts 64 and 66 driven at the same speed but in opposite directions from a common input shaft 68. An example of such a drive mechanism is the Model R113 Horizontal Right Angle Drive manufactured by the Boston Gear Division of the Alban Corporation, Newark, N.J.

A drive motor 70 is mounted within the support frame 60 and is connected as by means of a belt 72 to the input shaft 68 of the right angle drive unit 62. In this manner the two conveyors 26 and 28 are automatically driven in synchronism so that the channel 61 formed therebetween by the various mold segments 30 provided on each of these conveyors, moves longitudinally in the direction of the arrow A as a single interval unit.

Reverting to FIG. 1, it will be seen that as the web 14 passes into the channel 61 formed between the mold segments 30, it is gradually transformed from flat to semi-cylindrical configuration by the coming together of the mold segments 30 at the entrance end of the two conveyors 26 and 28. Because of the angulation of the two conveyors 26 and 28, the mold segments 30 are enabled to provide a smooth and gradual transition for the web 14 from flat to round configuration. This gradual transition serves to optimize the molding conditions for the reactants 12 which at this time are undergoing both foaming and curing reactions. As a result, the reactants become formed into a more uniform cylindrical configuration with a minimum of discontinuities, fissures, cavities or similar flaws.

The mold segments 30 at the far end of the conveyors 26 and 28 will, of course, diverge away from the completely formed foam cylinder at the exit end of the conveyors 26 and 28 in the same gradual manner. This gradual divergence permits release of the fully-formed foam cylinder, also with a minimum of disturbance. Thus the development of post-curing deformities is reduced to a minimum. The release paper 14 may be kept in contact with the foam cylinder for an additional duration and may thereafter be stripped away from the foam cylinder.

It will be appreciated, based upon the above, that in addition to the advantages already mentioned, the angulated configuration of the conveyors 26 and 28 permit the mold segments 30 to be constructed in such a manner as to provide solid support for the liquid reactants 12 and the resulting product formed therefrom. At the same time, the segments 30 impose a minimum of stress upon the conveyors 26 and 28 themselves, or any of the critical portions thereof. This is because the angle of the conveyors 26 and 28 permits them to absorb a large portion of the reactant load in directions perpendicular to the plane of the conveyor links 32. The segments 30 are constructed to be separated individually from the conveyor links 32 and replaced by other segments of different size or shape so that the configuration and size of the resulting product may be controlled at will.

While the molding apparatus described herein is particularly advantageous when the conveyors 26 and 28 are disposed with their drive axles 58 in mutually perpendicular orientation, it will be appreciated that for certain situations it may be desired to arrange these conveyors with their axles oriented at an angle of less than 90°. Such an arrangement would, of course, require a somewhat different drive system. However, the system could easily synchronize by use of conventional and readily available mechanisms.

Although a certain particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for use in the continuous molding of bulky elongated elements such as cylinders of foamed polyurethane, said apparatus comprising a pair of elongated endless loop conveyors, said conveyors being disposed in side-by-side relationship and tilted toward each other to define a trough therebetween, a plurality of mold segments disposed in close side-by-side positioned relationship on each conveyor, said mold segments being configured such that they cooperate during operation of said conveyors to define a continuous moving channel for containing material to be molded.

2. Apparatus as in claim 1 wherein each of said conveyors includes a drive shaft, and said drive shafts lie along intersecting lines to be driven from a common drive mechanism.

3. Apparatus as in claim 1 wherein each of said conveyors comprises a belt-like arrangement extending in the form of an elongated loop and made up of a plurality of hingeably interconnected solid flat sections for carrying said mold segments.

4. Apparatus as in claim 1 wherein said conveyors are secured in a common frame.

5. Apparatus as in claim 1 wherein said conveyors are tilted at an angle of 90° from each other.

6. Apparatus as in claim 5 wherein each of said conveyors includes a drive shaft, and wherein said drive shafts extend from a common right angle gear drive system which operates said conveyors in synchronism from a common power source.

7. Apparatus as in claim 1 wherein said mold segments are configured to define a semicylindrical moving channel between said conveyors.

8. Apparatus as in claim 1 wherein said mold segments are dimensioned and configured such that those on one conveyor extend adjacent those on the other conveyor in said channel and cooperate to define a continuous internal surface.

9. A continuous molding system for the manufacture of elongated elements of foamed polyurethane of substantial cross-section, said apparatus comprising a pair of elongated endless loop conveyors disposed in side-by-side relationship and tilted toward each other to define a trough therebetween, a plurality of mold segments secured to said conveyors, said segments being dimensioned and configured to lie closely adjacent one another in the vicinity of said trough to form a continuous moving mold channel of desired cross-section, means for feeding an elongated web of release material in sheet form into the upstream end of said mold channel to move along with said channel in the configuration thereof and means for depositing liquid reactants onto said release paper at said upstream end.

10. A molding system as in claim 9 wherein said means for feeding an elongated web of release material includes means for maintaining said material in flattened configuration at said depositing means in advance of the upstream end of said conveyors.

References Cited

UNITED STATES PATENTS

| | | | |
|---|---|---|---|
| 2,141,405 | 12/1938 | Randall | 18—4 |
| 2,817,875 | 12/1937 | Harris et al. | 18—4 |
| 3,048,888 | 8/1962 | Shockley et al. | 18—4 XR |
| 3,123,856 | 3/1964 | Dye et al. | 18—4 |
| 3,325,573 | 6/1967 | Boon et al. | 18—4 XR |
| 3,382,303 | 5/1968 | Stieg | 18—4 XR |

WILLIAM J. STEPHENSON, Primary Examiner